United States Patent [19]

Kurawaki et al.

[11] Patent Number: 5,782,313
[45] Date of Patent: Jul. 21, 1998

[54] DOUBLE SWING ARM MOTORCYCLE FRONT SUSPENSION

[75] Inventors: Ichiro Kurawaki; Toyoji Tanaka; Kazumasa Nakaya, all of Iwata, Japan

[73] Assignee: Yamaha Hatsudoki Kabushiki Kaisha, Iwata, Japan

[21] Appl. No.: 319,473

[22] Filed: Oct. 6, 1994

Related U.S. Application Data

[63] Continuation of Ser. No. 989,194, Dec. 11, 1992, abandoned, which is a continuation-in-part of Ser. No. 786,733, Nov. 1, 1991, abandoned.

[51] Int. Cl.$^6$ ............................................. B62K 25/04
[52] U.S. Cl. ............................................. 180/219
[58] Field of Search ............................ 180/219; 280/275, 280/276, 277, 279, 283, 668, 724

[56] References Cited

U.S. PATENT DOCUMENTS

| | | | |
|---|---|---|---|
| 2,953,395 | 9/1960 | Turner | 280/276 |
| 4,526,249 | 7/1985 | Parker | 180/219 |
| 4,627,632 | 12/1986 | McKagey | 280/276 |
| 4,727,951 | 3/1988 | Morioka et al. | 280/276 |
| 4,756,379 | 7/1988 | Kawano et al. | 180/219 |
| 4,756,547 | 7/1988 | Trema | 180/219 |
| 4,775,025 | 10/1988 | Parker et al. | 180/219 |
| 4,785,905 | 11/1988 | Trema | 180/219 |
| 4,813,511 | 3/1989 | Yamaguchi et al. | 180/219 |
| 5,044,648 | 9/1991 | Knapp | 280/276 |

FOREIGN PATENT DOCUMENTS

| | | | |
|---|---|---|---|
| 889870 | 9/1953 | Germany | 280/279 |
| 482796 | 7/1953 | Italy | 280/276 |
| 58-49435 | 11/1983 | Japan . | |
| 62-103277 | 5/1987 | Japan . | |
| 62-181988 | 8/1987 | Japan . | |
| 62-194987 | 8/1987 | Japan . | |
| 63-184583 | 7/1988 | Japan . | |
| 63-215478 | 9/1988 | Japan . | |
| 3-2889 | 1/1991 | Japan . | |
| 3-136994 | 6/1991 | Japan . | |
| 3-136996 | 6/1991 | Japan . | |
| 2112877 | 7/1983 | United Kingdom | 280/279 |
| 8803493 | 5/1988 | WIPO | 280/279 |

*Primary Examiner*—Kevin Hurley
*Attorney, Agent, or Firm*—KNobbe, Martens, Olson & Bear LLP

[57] ABSTRACT

The present invention is adapted to be embodied in a steering and suspension arrangement for the front wheel of a motorcycle. Specifically, the invention relates to a front wheel swing arm type steering and suspension arrangement. In the arrangement of the present invention, upper and lower swing arms connect a motorcycle frame to a steering knuckle which extends along one side of the front wheel. The upper swing arm is shorter in length than the lower swing arm and is pivotally connected to the frame of the motorcycle at a point forwardly of a pivotal connection for the lower swing arm. According to the invention, the swing arms are positioned so that forwards and backwards lateral movement of the suspension system is kept to a minimum and the rake angle of the steering arrangement is held nearly constant during suspension travel, as when the motorcycle encounters a bump during operation. The swing arm suspension arrangement of the invention is compact and allows for good maneuverability of the motorcycle and also for easy access to the engine, as for repairs. A telescoping tube assembly having a pair of elongated tubes reciprocal within associated bores, for absorbing the swing motion of the suspension arrangement, also comprises a portion of the steering arrangement of the invention.

19 Claims, 9 Drawing Sheets

DOUBLE SWING ARM MOTORCYCLE FRONT SUSPENSION

This application is a continuation of our application Ser. No. 07/989,194 filed Dec. 11, 1992, which application is a continuation-in-part of Ser. No. 07/786,733 filed Nov. 1, 1991, both of which are now abandoned.

BACKGROUND OF THE INVENTION

This invention relates to improvements in motorcycles and more particularly to a suspension and steering arrangement for the front wheel of a motorcycle.

Until relatively recently, motorcycles have been virtually universally equipped with a fork-type front end suspension system. The fork tubes are connected through a head assembly to a rotatable steering column which is journaled to the frame of the motorcycle. The axle of the front wheel is journaled to the lower ends of the fork tubes. Such designs have a recognized disadvantage in that all weight loads and road shocks on the front wheel are transmitted up through the front fork to the frame of the motorcycle, at a point on the frame which is well above and forward of the center of gravity of the motorcycle. This results in the front fork, the attached steering head, and the upper portions of the frame all being necessarily stronger, and thus heavier, than would be necessary to merely bear the suspension loads on the front wheel of the motorcycle. It also results in the entire front suspension system turning with the front wheel, when all that needs to be turned to effect steering is the front wheel, thus increasing the steering effort and the amount of unsprung mass of the front wheel.

In U.S. Pat. No. 4,526,249 to James G. Parker, issued Jul. 2, 1985, there was disclosed a motorcycle having a one-sided front swing arm suspension system. The system of the '249 patent includes upper and lower control arms which are hinged to the frame of the motorcycle and which extend forwardly from the frame to a kingpin. The kingpin extends along one side of the front wheel at a rake angle (i.e., the kingpin extends at an angle upwardly and rearwardly from the wheel axle to the steering column) which is similar to the rake angle of a conventional telescoping fork, and curves around the outer periphery of the wheel. A substantial rake angle is necessary and desirable to obtain satisfactory motorcycle steering response, and is also desirable because it renders the suspension most effective in absorbing road shocks.

The front wheel is journaled in a cantilevered fashion to an axle which extends transversely from the lower end of the kingpin. The lower control arm is arcuate and extends alongside of and around the front wheel. The lower control arm is connected to the lower end of the kingpin by means of a ball joint which allows the front wheel to be steered while also allowing swinging motion of the control arm. The upper control arm extends forwardly from the frame of the motorcycle and is connected to the upper end of the kingpin, above the front wheel, also by means of a ball joint. The upper and lower control arms swing in parallel so as to absorb road shocks and weight loads on the front wheel. Details of this suspension system are disclosed in the U.S. Pat. No. 4,526,249, which is expressly incorporated herein by reference.

It has been recognized that one primary advantage of the one-sided front swing arm suspension has been that weight and shock loads on the front wheel can be effectively borne by the motorcycle frame at a point low and close to the center of gravity of the frame, rather than at the point where the steering column is journaled to the frame.

There can be, however, certain difficulties with the steering and suspension arrangement as set out above. One such problem which may be encountered when employing a swing arm front wheel suspension system for a motorcycle involves forwards and backwards lateral movement of the arrangement as the swing arms move through their respective arcs about axes defined by the points at which the swing arms connect to the motorcycle's frame. Furthermore, changes in the rake angle can take place during suspension travel in connection with certain swing arm arrangements. Excessive lateral movement and changes in the rake angle can place undesirable stresses upon the suspension and steering arrangement components and can promote instability in the operation of a motorcycle. It is, thus, desirable that such forwards and backwards lateral movement be kept to a minimum and that the rake angle remain constant during suspension travel.

Lateral movement of the steering assembly and changes in the rake angle upon pivoting of the swing arm suspension arrangement can be minimized if the upper and lower swing arms are of equidistant length; such that the two swing arms, a line connecting the two respective forwardmost ends, as well as a line connecting their rearwardmost ends, together form a parallelogram. Such a parallelogram formation of the suspension assembly helps to ensure that the kingpin and front wheel move in a generally vertical direction and helps to maintain a constant rake angle throughout the length of the swing of the swing arms.

There are drawbacks, however, to parallelogram arrangements. In order to provide an adequate rake angle for the kingpin, the lower ball joint is normally located forwardly of the upper ball joint. Thus, in order to have a parallelogram formation, it is required that the upper swing arm have a pivot point located further rearwardly along the length of the motorcycle than that for the lower swing arm. Accordingly, the upper swing arm often must be located laterally outward of the motorcycle engine. The overall lateral width of the motorcycle is thereby increased, thus decreasing the angle available for leaning during turns. Furthermore, employing swing arms of equidistant length can necessitate the use of undesirably lengthy component parts in the suspension system. Such disadvantages can be observed in U.S. Pat. No. 4,756,547 to Trema (See for example FIG. 4 thereof), U.S. Pat. No. 4,813,511 to Yamaguchi et al (See for example FIGS. 9 and 13 thereof), and U.S. Pat. No. 4,756,379 to Kawano et al (See for example FIGS. 1, 3, 4 and 5 thereof).

It is, therefore, an object of this invention to provide an improved suspension and steering arrangement for the front wheel of a motorcycle overcoming the disadvantages of various previous arrangements.

It is further an object of this invention to provide a front swing arm suspension system for a motorcycle which is relatively compact in size, yet provides many of the advantages of a full sized parallelogram-type arrangement.

It is further an object of this invention to provide a front swing arm suspension system for a motorcycle which minimizes any forwards and backwards lateral movement and, also, minimizes changes in the rake angle of the arrangement, encountered during swinging motion of the swing arms during motorcycle operation.

Also, in connection with front wheel swing arm type motorcycle suspension systems, it has been known to employ a telescoping tube type arrangement wherein a single telescoping tube is positioned above the front wheel and kingpin to absorb changes in length between the handlebar assembly and the front wheel when the wheel moves upwardly, as when encountering a bump along a road during travel.

A single telescoping tube, however, often cannot provide the strength and durability required when large or violent movements take place within the suspension arrangement. Excessive force within a telescoping tube system may often place great pressure upon any seals within the telescoping assembly, sometimes leading to seal damage.

It is therefore yet another object of this invention to provide a strong and durable telescoping tube arrangement for absorbing upward movement of a front wheel swing arm motorcycle suspension.

U.S. Pat. No. 4,526,249 to Parker discloses a single telescoping tube steering shaft which has a spline joint connection. It has been determined though, that the use of a spline joint in such a telescoping tube arrangement, having only a single telescoping tube connecting the handlebar assembly and the kingpin, results in rickety and/or wobbly steering operations of the motorcycle. Further, in using merely a spline joint in the telescoping tube arrangement problems can be encountered regarding the ease with which the shaft slides within its bore.

It is, accordingly, an object of this invention to provide an arrangement suitable for use in combination with a spline joint connection of a telescoping tube arrangement which will diminish problems of wobble in the steering operations of a motorcycle and which will enable the telescoping shafts to slide smoothly and readily within their bores.

Additionally, regarding an arrangement employing a plurality of telescoping tubes, it is desirable that the tubes be truly parallel to one another and that the bores be truly parallel to one another so that each tube can slide smoothly in and out of its respective bore along a line of optimal performance without tending to draw any neighboring tube off of its optimal line of reciprocal movement. Poor sliding performance of the plural telescoping tube assembly will obviously result if the telescoping tubes (and bores) are not truly parallel to one another.

It is, therefore, yet a further object of this invention to provide a telescoping tube arrangement employing a plurality of tubes and respective bores which will avoid problems which can result from even slight imperfections or deviations from a desired truly parallel relationship between these components of the telescoping assembly.

SUMMARY OF THE INVENTION

The present invention is adapted to be embodied in a steering and suspension arrangement for the front wheel of a motorcycle. A first feature of the invention comprises a frame, an engine adjoining the frame, a steering knuckle extending along one side of the front wheel, an upper swing arm having first and second ends, and a first connection whereat the first end of the upper swing arm is connected at the frame and a second connection whereat the second end of the upper swing arm is connected proximate an upper portion of the steering knuckle. Also provided is a lower swing arm having first and second ends, a third connection whereat the first end of the lower swing arm is connected at the frame and a fourth connection whereat the second end of the lower swing arm is connected at a lower portion of the steering knuckle. According to the invention, the lower swing arm is longer than the upper swing arm, along a longitudinal direction of the motorcycle, and the first connection of the upper swing arm is positioned laterally forward of the engine.

A second feature of the invention comprises a frame, a handlebar assembly connected to the frame at an upper, forward region thereof, a steering knuckle extending along one side of the front wheel, a swing arm having first and second ends, and a first connection whereat the first end of the swing arm is connected at the frame and a second connection whereat the second end of the swing arm is connected proximate the steering knuckle. A compressible telescoping tube assembly is positioned between the steering knuckle and the handlebar assembly. The compressible telescoping tube assembly includes a plurality of elongated tubes and a plurality of bores, wherein the tubes are slidably receivable within the bores.

A third feature of the invention comprises a frame, a handlebar assembly connected to the frame at an upper, forward region thereof, a steering knuckle extending along one side of the front wheel, a swing arm having first and second ends, and a first connection whereat the first end of the swing arm is connected at the frame and a second connection whereat the second end of the swing arm is connected proximate the steering knuckle. A compressible telescoping tube assembly is positioned between the steering knuckle and the handlebar assembly. The compressible telescoping tube assembly includes an elongated tube and a bore, wherein the tube is slidably receivable within the bore. A ball bearing arrangement is positioned between the bore and the elongated tube.

DETAILED DESCRIPTION OF THE PREFERRED EMBODIMENT

Figure 1:
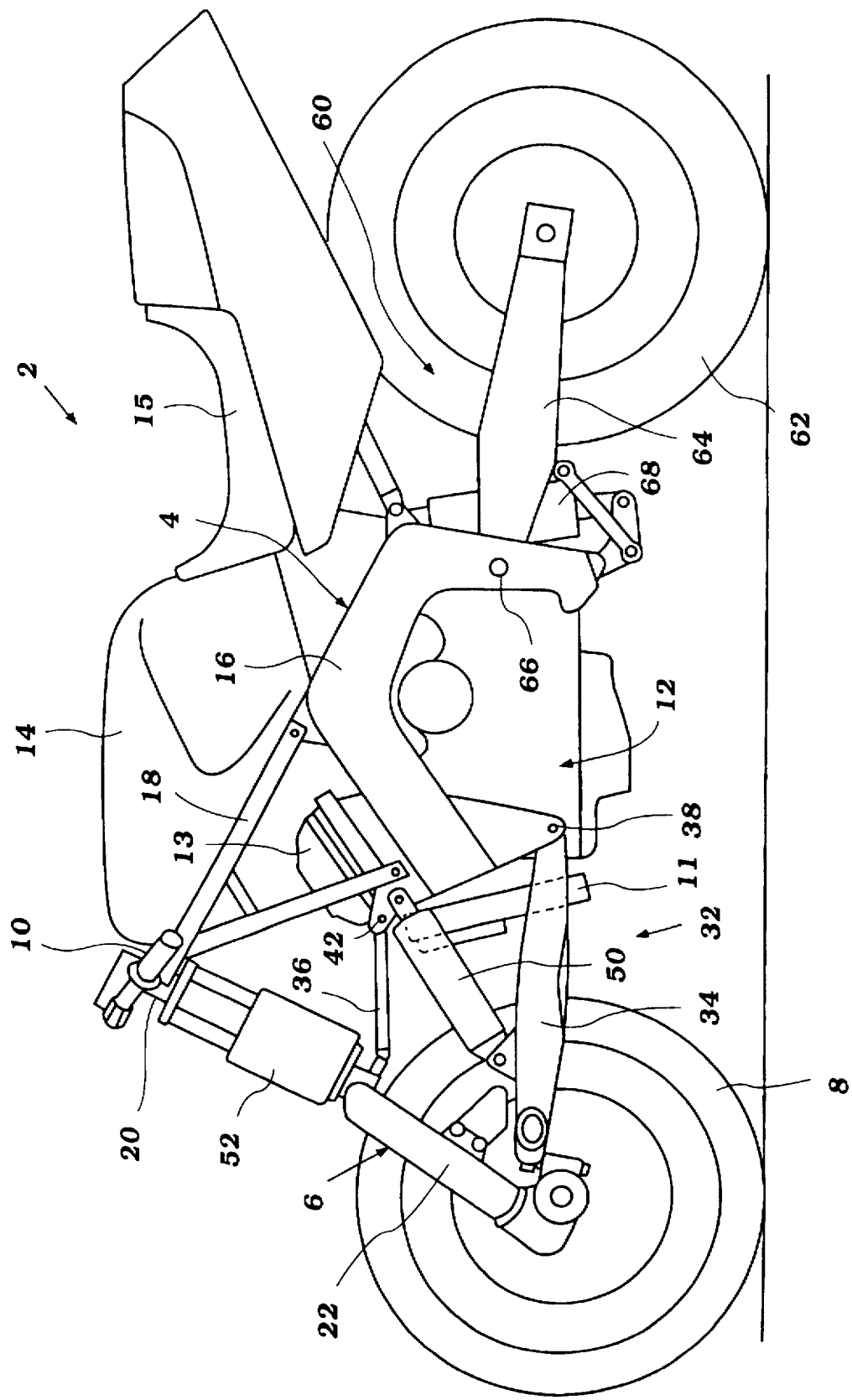
FIG. 1 is a side elevational view of a motorcycle having a front wheel suspension arrangement constructed in accordance with the present invention.
Figure 2:
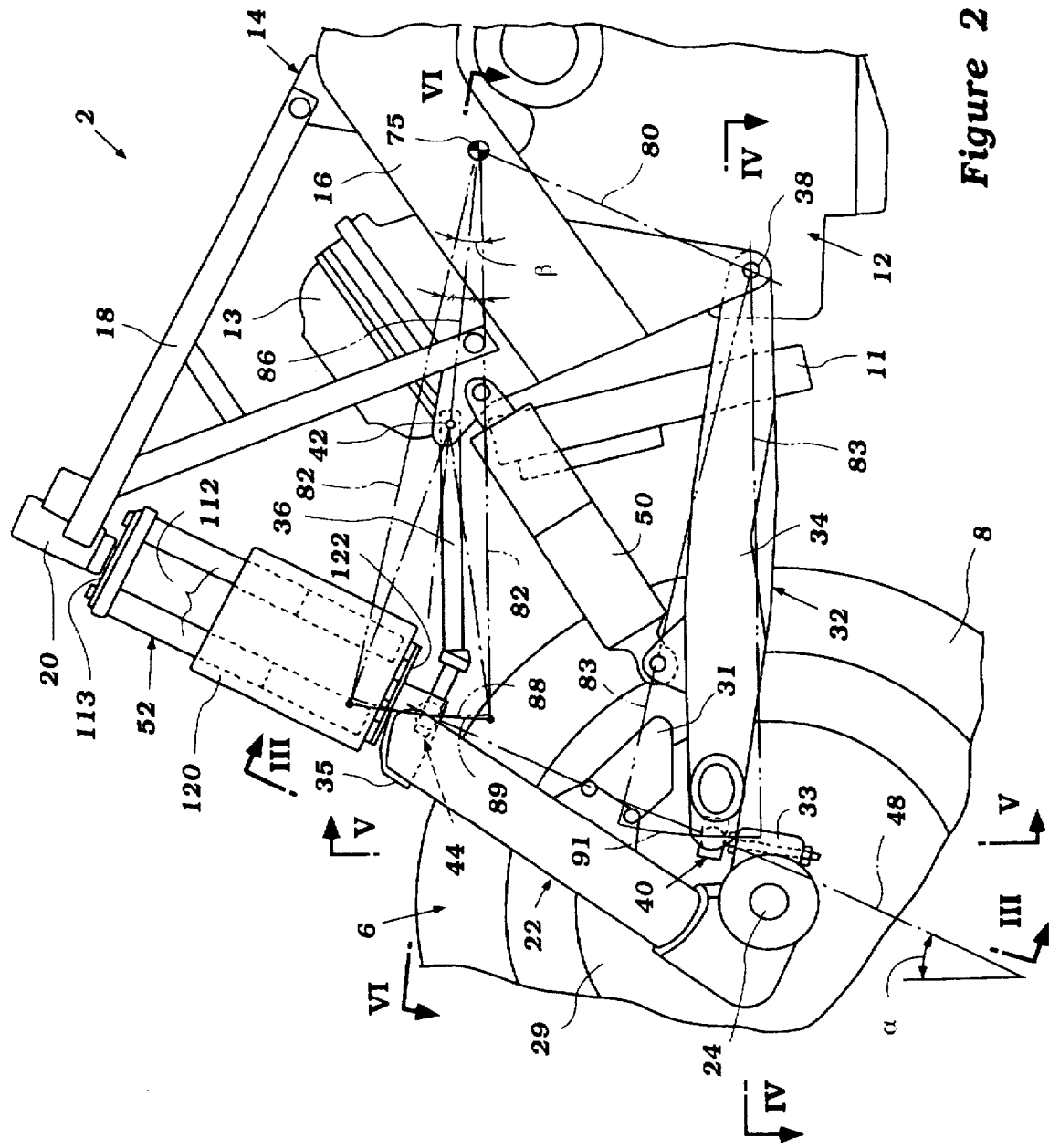
FIG. 2 is a side elevational partial view, with portions shown in phantom, of a forward portion of the motorcycle of FIG. 1.

Referring now to the Figures, and first primarily to FIGS. 1 and 2, a motorcycle, indicated generally by the reference numeral 2, is shown which incorporates the present invention. It should be noted, however, that the invention is not limited to the illustrated motorcycle construction, and may be employed with any construction which permits operation of the suspension system to be hereinafter detailed.

The motorcycle 2, as illustrated, includes a body frame and a front wheel suspension system, denoted generally by the reference numerals 4 and 6, respectively. A steerable front wheel 8 is rotatably supported by the front wheel suspension system 6. Also, various conventional components are included; for example, a handle bar 10, a fuel tank 14 and a seat 15. Further included is an engine 12 and an associated radiator 11, both illustrated in simplified form. The engine 12 may be of any suitable type. A cylinder head of the engine 12 is denoted by the reference numeral 13.

Figure 4:
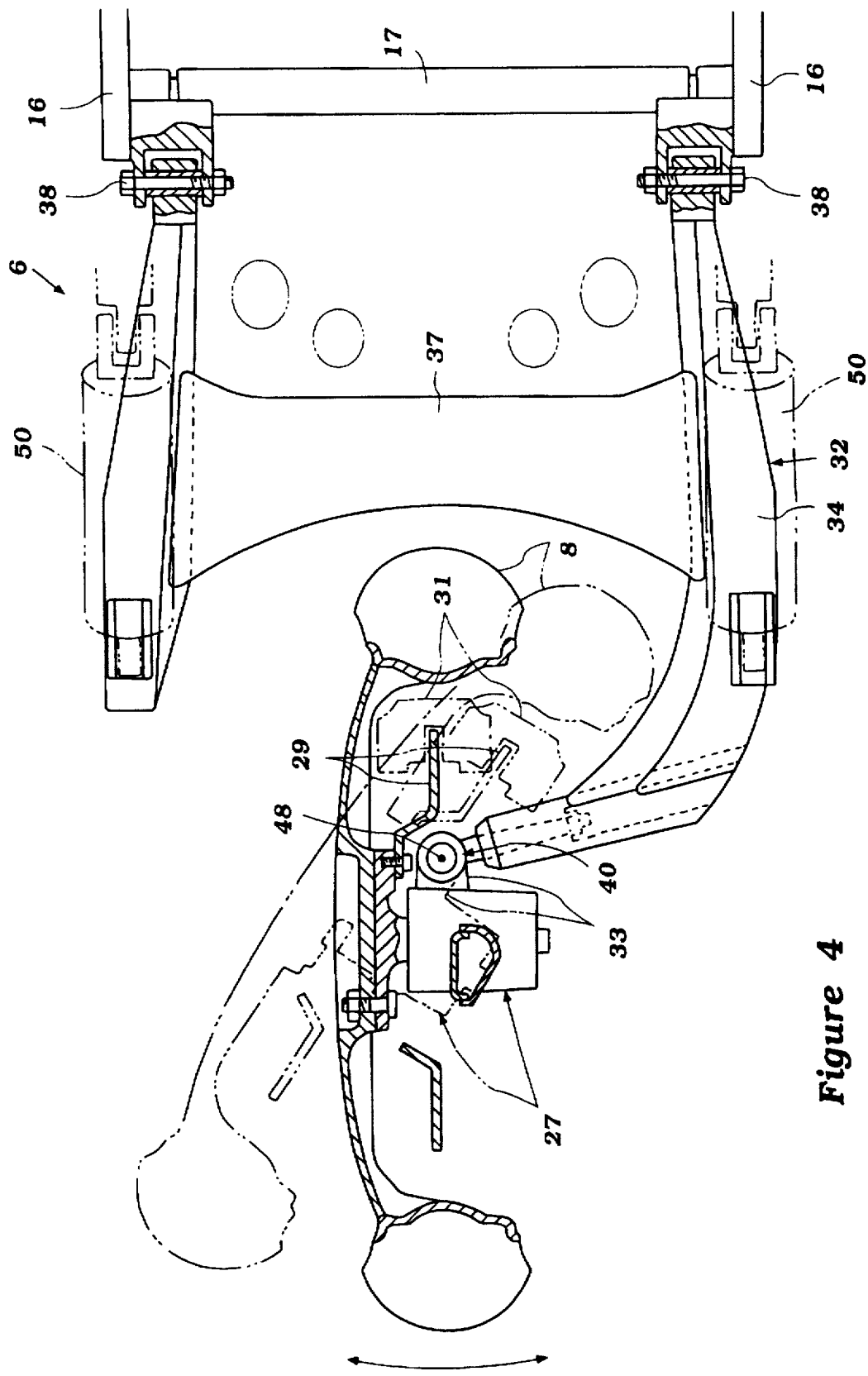
FIG. 4 is a cross-sectional view taken along the line IV—IV of FIG. 2.

The body frame 4 is provided with a pair of main brackets (also referred to as two separate main portions) 16, with one bracket (or, main frame portion) 16 lying on each side of the engine 12. Thus, the engine 12 is, in effect, sandwiched between the brackets 16. The brackets 16 are tightly connected to one another by a cross member 17 (FIG. 4). The cross member 17 is also referred to as a lateral cross-bar 17. At a forward portion of the brackets 16 there is formed a steering frame 18 which, when viewed from the side, as in FIGS. 1 and 2, is in the form of a triangle projecting upward and forwardly at its uppermost corner. A head pipe 20 is mounted along this projecting corner of the steering frame 18 and supports the handle bar assembly 10.

Figure 3:
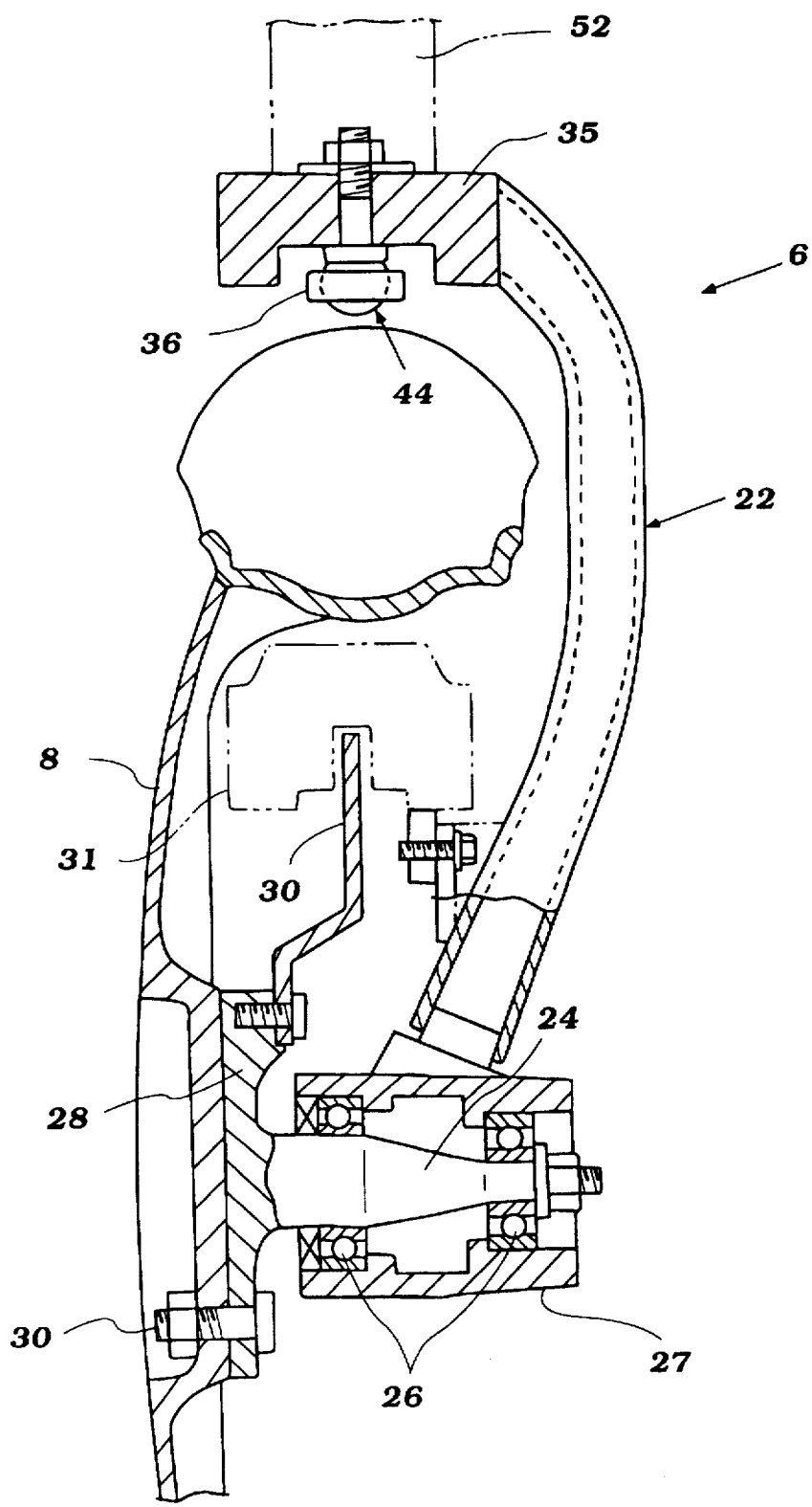
FIG. 3 is a cross-sectional view taken along the line III—III of FIG. 2.

The above-mentioned front wheel suspension device 6 is of the so-called wishbone e and has a steering knuckle (also known as a kingpin) 22 located to the left side of the front wheel 8, relative to a seated operator. A wheel shaft or axle 24 extends into and is journaled in a bearing assembly 26 located within a housing 27 at the lower end of the steering knuckle 22, as shown in FIG. 3. A flange 28 is formed on the right-hand side of the wheel shaft 24. The front wheel 8 is secured by bolts 30 to the flange portion 28, so that the front wheel 8 may be supported by the lower end of the steering knuckle 22. Also shown in FIG. 3 is a disc brake assembly comprising an annular brake disk 29 and a disk pad housing 31.

Figure 5:
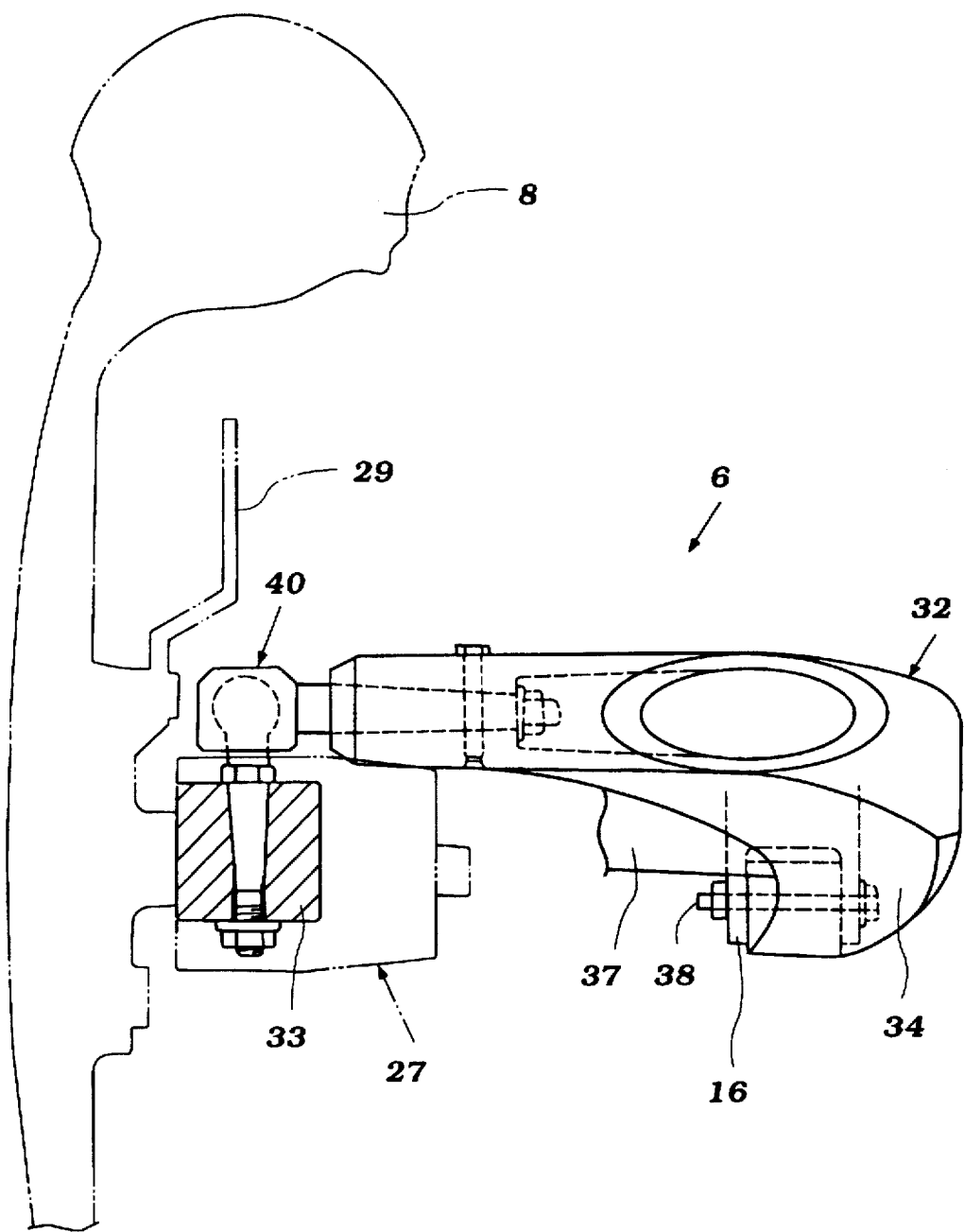
FIG. 5 is a cross-sectional view taken along the line V—V of FIG. 2.

The steering knuckle 22 is supported, for upward and downward movement, along the forwardmost portion of the main brackets 16 by a linkage arrangement, denoted generally by the reference numeral 32. The linkage arrangement 32 specifically includes pair of control arms, having a lower arm 34 and an upper arm 36. The lower arm 34, as illustrated in FIGS. 4 and 5, is pivotally connected to a forward, lower end of the brackets 16 about a pivot shaft 38. The lower arm 34 has a forwardmost rocking end to which the lower portion of the steering knuckle 33 is connected via a ball joint 40.

Figure 6:
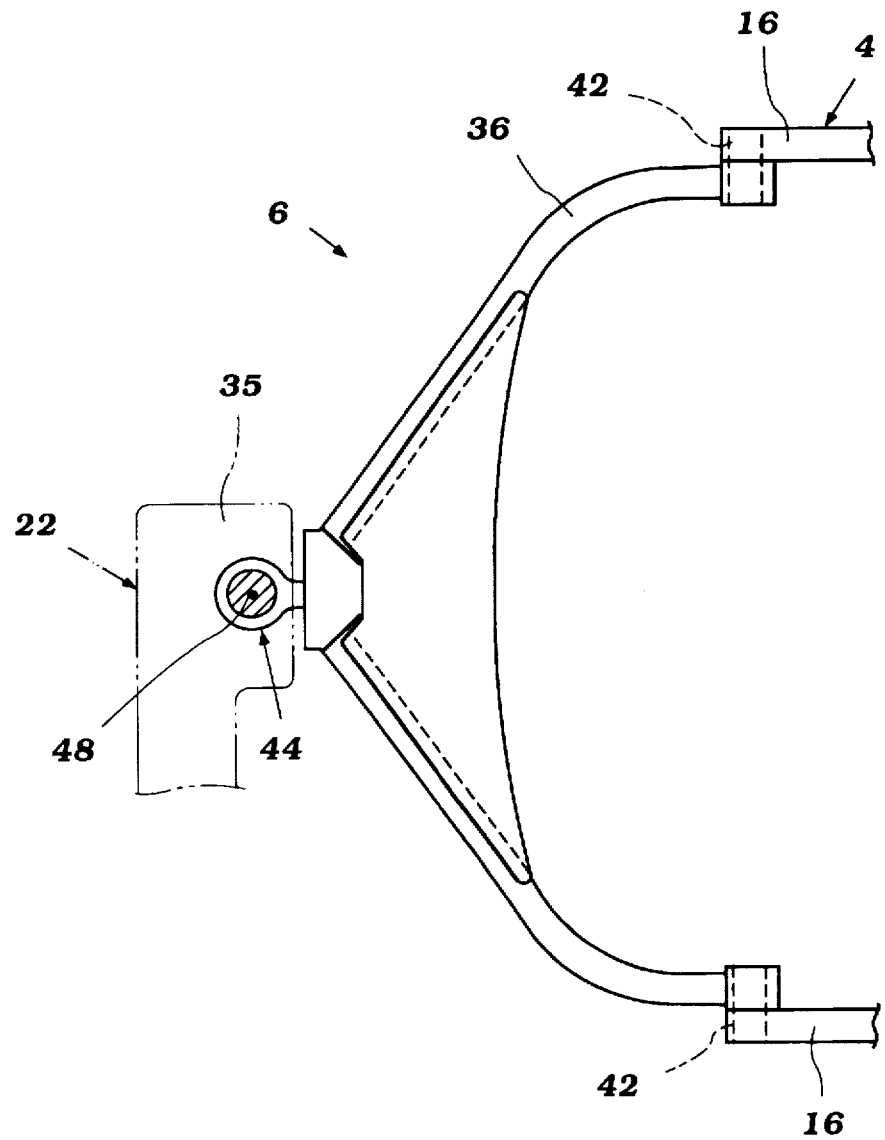
FIG. 6 is a cross-sectional view taken along the line VI—VI of FIG. 2.

As particularly illustrated in FIG. 6, the upper arm 36 has a rearwardly extending U-shape. The rearwardmost ends of the rearwardly extending left and right sides of the upper arm 36 are pivotally connected to the main brackets 16 through respective pivot shafts 42. The upper arm 36 is swingable about the pivot shafts 42 and has a forwardmost end to which an upper portion of the steering knuckle 35 is connected by way of another ball joint 44. Together, the lower and upper ball joints, 40 and 44, permit universal pivotal motion between the steering knuckle 22 and each of the control arms, 34 and 36.

The axis extending from the lower and upper ball joints, 40 and 44, represents the steering axis 48 about which the steering knuckle 22 and front wheel 8 are steerable.

It should be noted that in the illustrated embodiment the upper ball joint 44 is positioned at a point above the front wheel 8. The rear pivot point 42 for the upper swing arm 36 is positioned forwardly of the rear pivot point 38 of the lower swing arm 34 and forwardly of the engine 12. The lower ball joint 40 is located at a position vertically upward of the front wheel axis 24.

A hydraulic shock absorber 50 is provided between a front upper portion of the main brackets 16 and the lower arm 34. The shock absorber 50 is operative to maintain the lower arm 34 and steering knuckle 22 in a predetermined position by absorbing shocks transmitted from the front wheel 8 to the body frame 4 by way of extending and contracting motions. As shown in FIG. 4, the lower swing arm 34 may have a generally horizontal portion 37 which arcs around the rear of the front wheel 8, thus permitting a pair of such hydraulic shock absorbers 50 to be employed.

Cooperating with these extending and contracting motions of the shock absorber(s) 50 is a telescoping tube arrangement 52 disposed between the steering knuckle 22 and the handle bar assembly 10, embodiments of which are described in detail below.

The motorcycle construction as depicted in FIG. 1 employs a rear swing arm suspension system, denoted generally by the reference numeral 60, in addition to the front spring suspension system of the invention 32. The rear wheel 62 of the motorcycle 2 is journaled to the end of a U-shaped fork or swing arm 64. The rear swing arm 64 is hinged to a rearward portion of the frame 16 of the motorcycle 2 about a pivot axis 66 and extends rearwardly. The rear swing arm 64 and wheel 62 undergo vertical swinging motion in response to road shocks and varying weight loads. The swing arm 64 is spring loaded downwardly, by way of a shock absorber 68, so that the swing arm 64 can bear ordinary weight loads as well as road shocks.

The compact swing arm arrangement of the present invention will now be described in detail, with particular reference to FIG. 2. As noted above, there are advantages to be had from a double swing arm front wheel suspension arrangement which takes the form of a true parallelogram. However, such arrangements can be large and cumbersome. One feature of the present invention provides many of the advantages of a parallelogram arrangement, yet in a relatively compact system.

In FIG. 2, the reference numeral 75 represents a point on each respective frame bracket 16 which lies at one corner (also referred to as an apex) of a parallelogram additionally defined by the lower pivot axis 38, the lower ball joint 40, and the upper ball joint 44. The reference numeral 80 denotes a line (shown as a broken line) joining the point 75 and the lower pivot axis 38, and which is parallel to a line running the steering axis 48. The reference numeral 82 denotes a line (also shown as a broken line) joining the point 75 and the upper ball joint 44, and which is parallel to an axial line 83 running through the lower swing arm 34, between the lower ball joint 40 and the pivot axis 38.

The point 75, hereinafter referred to as a "phantom axis" represents the point at which an upper pivot axis would be placed for an upper swing arm in a parallelogram arrangement. The line 82 running forwardly from the phantom axis 75 represents such an upper swing arm in a parallelogram arrangement, and will hereinafter be referred to as a "phantom arm." It should be noted that the phantom arm 82 and the line 83 running axially through the lower swing arm 34 are illustrated in FIG. 2 in varying positions through their swing angles about their pivot axes, 75 and 38 respectively. Such would be the motions of a true parallelogram arrangement during travel of the upper and lower pivot arms.

In an effort to achieve the advantages of a true parallelogram swing arm front suspension arrangement, the swing arm system 6 of this invention is based upon the parallelogram, as defined above, having at its corners (or, apexes) the phantom axis 75, the lower pivot axis 38, the lower ball joint 40, and the upper ball joint 44. Specifically, the pivot axis 42 for the upper link 36 lies at a point on a line 86 which bisects the swing angle β of the phantom arm 36 when the motorcycle 2 is normally laden, yet is located substantially forwardly of the phantom axis 75. The upper ball joint 44, at the end of the upper swing arm 36, is placed so that the arc 88 defined by its swinging motion intersects the arc 89 defined by the outer sweep of the phantom arm 82.

As can be seen in FIG. 2, the arc 88 swept by the upper ball joint 44 lies very close to the arc 89 swept by the phantom arm 82. Thus, as the lower swing arm pivots about its pivot axis 38 and the lower ball joint is moved through its arc 91, the upper ball joint 44 is moved through a path very similar to that which would occur in a true parallelogram system. Accordingly, the assembly of the invention helps to ensure that the kingpin and front wheel move in a generally vertical direction and helps to maintain a nearly constant rake angle throughout the length of the swing of the swing arms.

The upper swing arm 36 of the present invention is relatively short as compared to that which would be required in a true parallelogram arrangement, like the phantom arm 82 in FIG. 2. It is therefore possible to place the upper swing arm 36 forwardly of the main body of the engine 12. Such placement allows a construction having a narrower lateral width as compared to a true parallelogram arrangement which must lie laterally outward of the main body of the engine 12, like the phantom arm 82 in FIG. 2. Also, placement of the rear pivot axis 42 of the upper swing arm 36 forwardly of the engine cylinder head 13 improves access to such portions of the engine 12 for easy maintenance.

Figure 7:
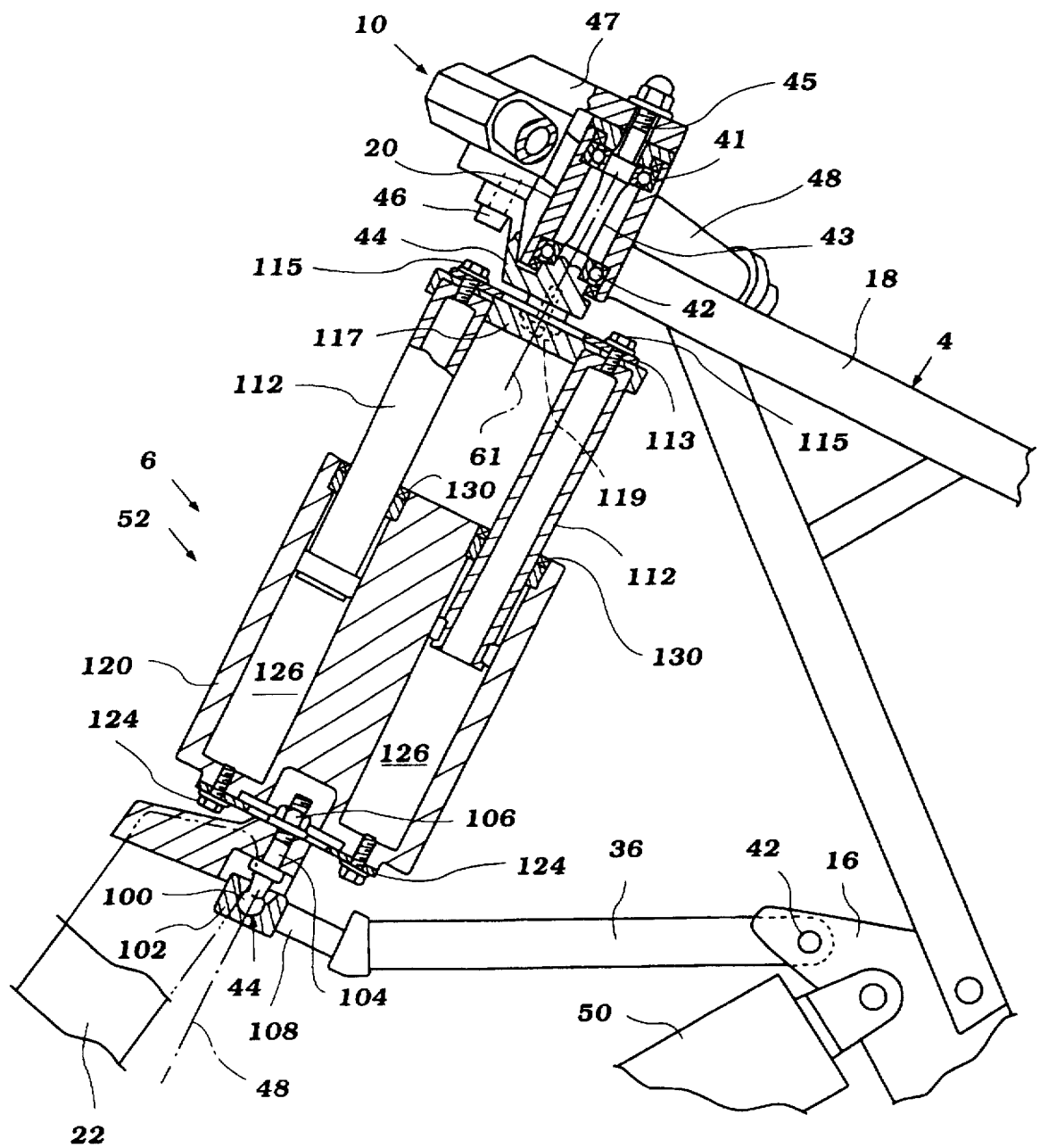
FIG. 7 is an enlarged side view, with portions shown in section, of the front wheel suspension arrangement in accordance with the present invention.

Referring now particularly to FIG. 7, an arrangement of the telescoping tube assembly 52, and certain associated components, will be described. As shown in the Figure, the upper ball joint arrangement 44 includes a ball 100 which is held within a socket structure 102. Extending primarily upward and somewhat rearwardly from the ball 100, out of the socket structure 102, is a bolt 104 which extends through a top portion of the steering knuckle 22 and is secured thereto, as by way of a nut 106. A support plate 108 extends primarily rearward and somewhat downwardly from the socket structure 102. The rearwardmost end of the support plate 108 is attached to a forward portion of the upper swing arm 36.

The telescoping tube arrangement 52 is composed of a pair of sliding shafts 112, mounted to a lower end of the handle bar arrangement 10 through a first blade spring 113 and a plate member 117, by way of a pair of threaded fasteners 115. The plate member 117 and blade spring 113 are connected through their central regions to the handlebar assembly 10, and its related components, by a suitable fastener 119. A casing 120 is mounted on an upper end of the steering knuckle 22 through a second blade spring 122, by way of a further pair of threaded fasteners 124.

The sliding shafts 112 each have a protruded end slidably inserted, along their axial direction, into respective bores 126 located within the casing 114. Seals 130, positioned at an uppermost region of each bore 126, sealingly engage each sliding shaft 112 about the shaft's outer circumference. A readily compressible substance, such as air or oil, may fill the bores 126 and hollow inner regions of the shafts 112.

Steering of the front wheel 8 is accomplished by turning the handle bar assembly 10 about the steering axis 48, and occurs through the telescoping tube arrangement 52 and the steering knuckle 22. During operation of the motorcycle 2, when vertical movement is imparted to the steering knuckle, for example when the front wheel 8 encounters a bump, the sliding shafts 112 slide relative to the casing 120 in order to absorb variations in the vertical positioning of the steering knuckle 22 relative to the handle bar assembly 10. Further, the blade springs 113 and 122 function to absorb the variation of the relative inclination of the steering knuckle 22, handle bar assembly 10 and the telescoping tube arrangement 52.

Employing multiple tubes in the telescoping tube arrangement 52, between the handlebar assembly 10 and the steering knuckle 22, distributes forces incurred by steering and movement of the swing arm assembly among the various tubes 112 and their related components; for example their associated seals 130. Thus, less pressure is placed upon any single seal 130 as opposed to a tube arrangement employing only a single telescoping tube, and sealing about the sliding tubes 112 is thereby improved. Further, additional strength throughout the entire telescoping arrangement may be realized for incurring both compressive and shear forces which arise during turning operations and swinging motions of the swing arms.

Figure 8:
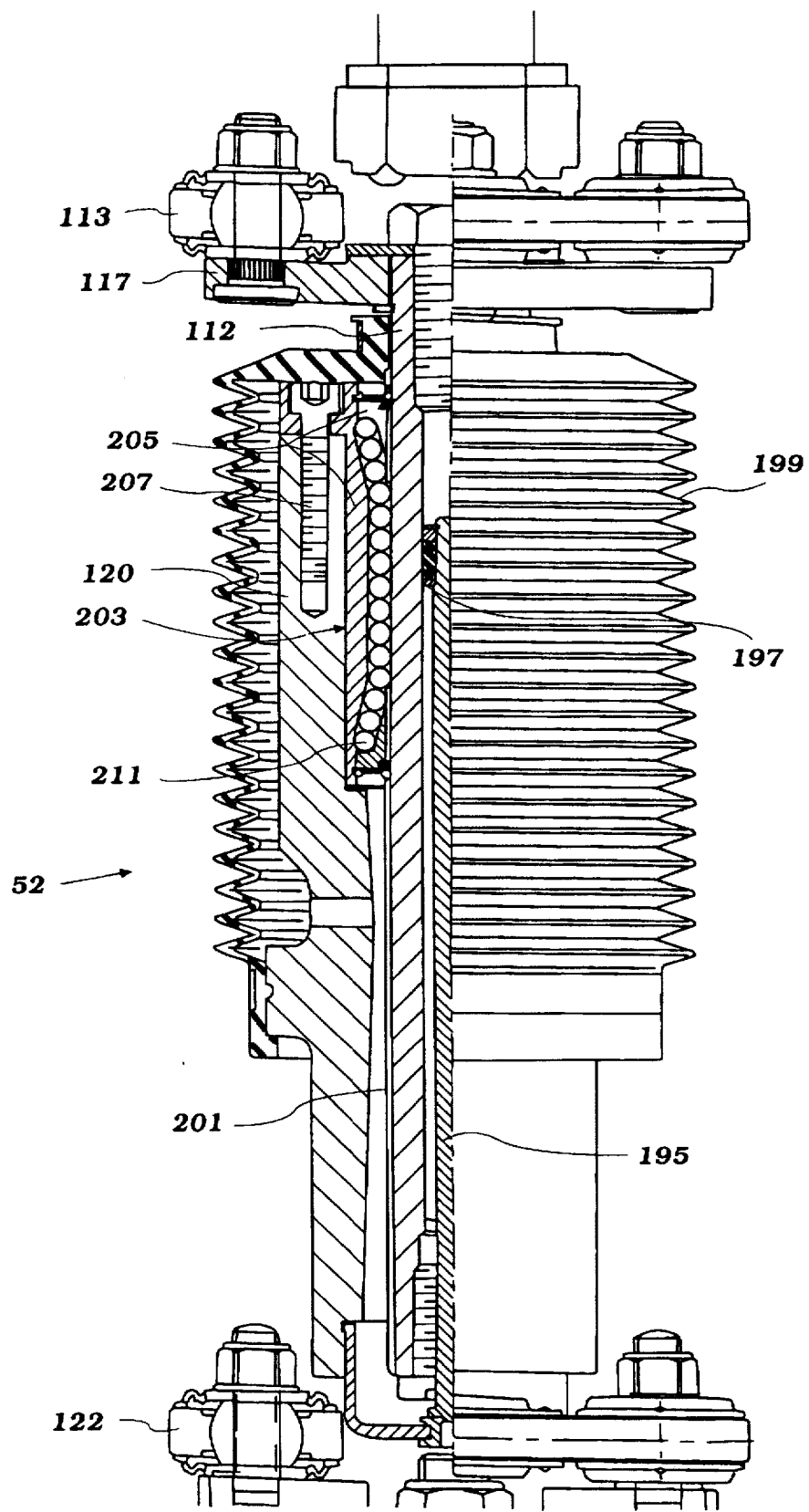
FIG. 8 is a side cross-sectional view of a telescoping tube arrangement employable with the front wheel suspension of the present invention.
Figure 9:
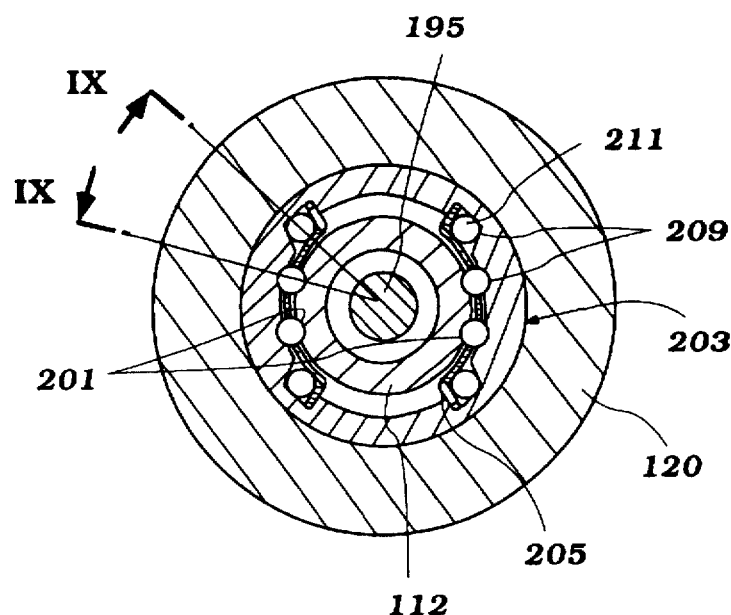
FIG. 9 is a horizontal cross-sectional view taken through the telescoping tube arrangement shown in FIG. 8.
Figure 10:
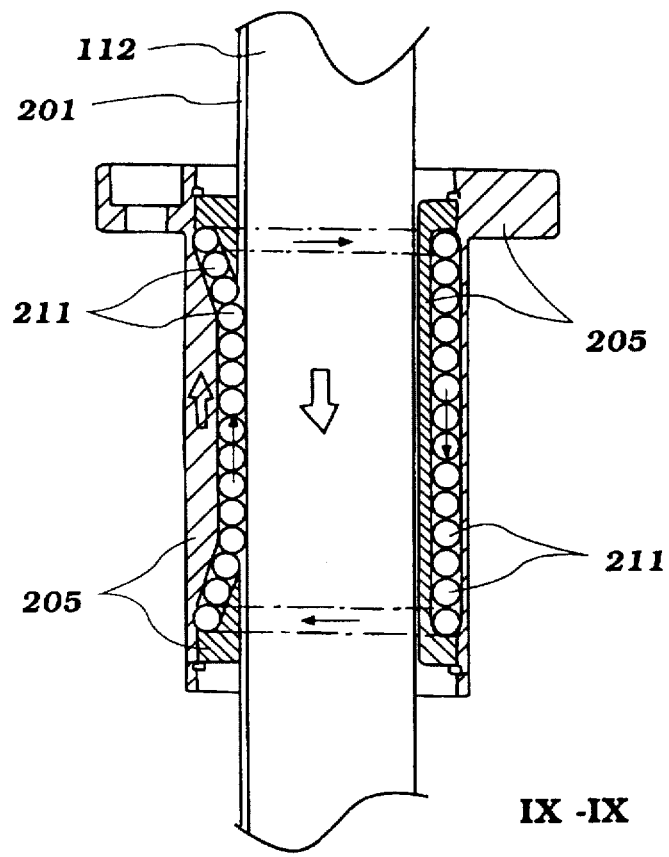
FIG. 10 is a cross-sectional view taken along the line IX—IX of FIG. 9.

An alternative embodiment useful in optimizing the performance of the sliding shaft construction for the telescoping tube assembly 52, as just described, is depicted in FIGS. 8 through 10. The arrangement of FIGS. 8 through 10 shows the utilization of a spline joint and recirculating ball bearing arrangement employed in combination with a telescoping tube arrangement 52 substantially as shown in FIG. 7. Details of the structural arrangement of FIGS. 8 through 10 will next be described. Since much of the structure shown in FIGS. 8 through 10 is similar or identical to that shown and described for FIG. 7, the following description utilizes reference numerals common to those used in the description of FIG. 7 to indicate like elements.

With initial reference to FIGS. 8 and 9, the telescoping tube assembly as shown includes an elongate cylindrical rod 195 extending upwardly from a location proximate the blade spring 122 into a centerline region of the sliding shaft 112. A stopper member 197 (FIG. 8) is interposed between the centrally located rod 195 and the sliding shaft 112. A flexible bellows 199 is positioned about a substantial portion of the telescoping tube assembly 52, as can be seen in FIG. 8.

Several splines 201 are formed along the length of the sliding shaft 112. While only one of the sliding shafts 112 is shown, it is to be understood that two shafts 112 as shown and described with reference to FIG. 7 may be constructed in the manner presently described. The casing 120 of the telescoping tube assembly 52 is provided with a recess along its inner side at its upper end for accommodating a recirculating ball bearing assembly, indicated generally by the reference numeral 203, for use in combination with each sliding shaft 112. The recirculating ball bearing assembly 203 includes a ball bearing support guide arrangement 205 secured in place with respect to the casing 120 by way of at least one threaded fastener 207. The ball bearing support guide arrangement 205 is provided with several longitudinally extending splines 209. Certain of the splines 209 of each ball bearing support guide arrangement 205 are aligned adjacent the splines 201 in its corresponding sliding shaft 112.

A plurality of ball bearings 211 are held in place for recirculating movement within tracks defined in part by each bearing support guide arrangement 205 alone and in part by each bearing support guide arrangement 205 together with the splines 201 in each corresponding sliding shaft 112. FIG. 10 shows one such track and depicts the recirculating movement of the ball bearings 211 during a condition wherein the ball bearing support guide arrangement 205 is moved upwardly along the sliding shaft 112 and, consequently, the sliding shaft is imparted a downward motion relative to the ball bearing support guide arrangement 205. This relative movement is shown by the two open arrows in FIG. 10. During, and as a result of, such movement, the ball bearings 211 are circulated along the track in a clockwise direction as shown by the four blackened arrows.

There are a number of advantages to be gained from a spline joint utilizing a recirculating ball bearing arrangement over a mere spline joint connection alone; especially in a multiple tube telescoping tube assembly. Use of only a spline joint in a telescoping tube arrangement, having only a single telescoping tube connecting the handlebar assembly and the steering knuckle, can cause rickety and/or wobbly steering operations of the motorcycle. Further, in using only a spline joint in the telescoping tube arrangement problems can be encountered regarding the ease with which each shaft slides within its respective bore. Employing a dual parallel tube arrangement for the telescoping tube assembly helps to reduce wobble in the steering. By employing a recirculating ball bearing arrangement in combination with the spline joint connection of the dual telescoping tube arrangement, wobble in the steering operations of the motorcycle is diminished and the shafts are able to slide smoothly and readily within their bores.

Additionally, regarding an arrangement employing a plurality of telescoping tubes (as described above), it is desirable that the tubes be truly parallel to one another and that the bores be truly parallel to one another so that each tube can slide smoothly in and out of its respective bore along a line of optimal performance without tending to draw any neighboring tube off of its line of similar movement. Poor sliding performance of the plural telescoping tube assembly will obviously result if the telescoping tubes (and bores) are not truly parallel to one another. Use of the recirculating ball bearing arrangement in combination with a spline joint connection, as detailed above, helps to avoid problems which can result from even slight imperfections or deviations from a desired truly parallel relationship between these components of the telescoping assembly.

It should be readily apparent from the foregoing description that an improved suspension and steering arrangement for the front wheel of a motorcycle has been illustrated and described; and particularly, an improved one-sided front swing arm suspension system for a motorcycle. Although the invention has been illustrated and described with reference to a particular preferred embodiment, various changes and modifications may be made from the preferred embodiment without departing from the spirit and scope of the invention, as defined by the appended claims.

It is claimed:

1. A steering and suspension arrangement for a front wheel of a motorcycle comprising: a frame, an engine adjoining said frame, a steering knuckle extending along one side of said front wheel, an upper swing arm having first and second ends, a first pivotal connection between said first end of said upper swing arm and said frame and a second pivotal connection between said second end of said upper swing arm an upper portion of said steering knuckle, a lower swing arm having first and second ends, a third pivotal connection between said first end of said lower swing arm and said frame and a fourth pivotal connection between said second end of said lower swing arm and a lower portion of said steering knuckle; said lower swing arm being longer than said upper swing arm, along a longitudinal direction of said motorcycle, and said first pivotal connection being positioned forward of said third pivotal connection and lying on an upper line of an imaginary parallelogram, said imaginary parallelogram having four apexes with three of said apexes lying on the second, third and fourth pivotal connections, respectively, when the motorcycle is normally laden so that said swing arms function substantially as a parallelogram.

2. The steering and suspension arrangement of claim 1 wherein a forward portion of said upper line of said imaginary parallelogram is moveable in a generally upward and downward direction through a swing angle about a pivot axis defined by an upper and rearwardly located apex of said imaginary parallelogram; and wherein said first pivotal connection is located upon a line which bisects said swing angle.

3. The steering and suspension arrangement of claim 2 further comprising a first arc defined by a motion path of an outermost point of said upper line of said imaginary parallelogram during movement of said upper line through its swing angle; and wherein said upper swing arm is moveable through a swing angle about an axis defined by said first pivotal connection so that a second arc is defined by a motion path of said second pivotal connection during movement of said upper swing arm through its swing angle; and wherein said first arc and said second arc have a common point at which they intersect.

4. The steering and suspension arrangement of claim 3 wherein said first and third pivotal connections are ball joint connections.

5. The steering and suspension arrangement of claim 4 further comprising a handlebar assembly connected to said frame at an upper, forward region thereof; and a compressible telescoping tube assembly positioned between said steering knuckle and said handlebar assembly; wherein said compressible telescoping tube assembly includes a plurality of elongated tubes and a plurality of bores, said bores located within a common housing unit and said tubes slidably receivable within said bores.

6. The steering and suspension arrangement of claim 1 further comprising an axis about which said front wheel is located beneath said second pivotal connection, and said fourth pivotal connection is located higher than said axis of said front wheel.

7. The steering and suspension arrangement of claim 6 wherein said first and third pivotal connections are ball joint connections.

8. The steering and suspension arrangement of claim 6 wherein said frame comprises two separate main portions, wherein a first main frame portion is positioned on one side of said engine and a second main frame portion is positioned on an opposing side of said engine.

9. The steering and suspension arrangement of claim 8 further comprising a lateral cross-bar rigidly connecting said first and second main frame portions together.

10. The steering and suspension arrangement of claim 9 wherein said engine comprises a plurality of cylinders disposed in an inline type arrangement.

11. The steering and suspension arrangement of claim 10 wherein said first pivotal connection is located forwardly of a forwardmost cylinder of said engine.

12. The steering and suspension arrangement of claim 11 further comprising a handlebar assembly connected to said frame at an upper, forward region thereof; and a compressible telescoping tube assembly positioned between said steering knuckle and said handlebar assembly; wherein said compressible telescoping tube assembly includes a plurality of elongated tubes and a plurality of bores, said bores located within a common housing unit and said tubes slidably receivable within said bores.

13. A steering and suspension arrangement for a front wheel of a motorcycle comprising: a frame, a handlebar assembly connected to said frame at an upper, forward region thereof, a steering knuckle extending along one side of said front wheel, a swing arm having first and second ends, a first pivotal connection between said first end of said swing arm and said frame and a second pivotal connection between said second end of said swing arm and said steering knuckle, and a compressible telescoping tube assembly positioned between said steering knuckle and said handlebar assembly; wherein said compressible telescoping tube assembly includes a plurality of elongated tubes and a plurality of bores, said tubes slidably receivable within said bores.

14. The steering and suspension arrangement of claim 13 further comprising a common housing within which said bores are located.

15. The steering and suspension arrangement of claim 14 further comprising a seal positioned at an upper region of each of said bores, each of said seals engaging a respective one of said tubes.

16. The steering and suspension arrangement of claim 15 further comprising an upper blade spring member and a lower blade spring member, wherein said upper blade spring member is disposed between an uppermost portion of said telescoping tubes and said handlebar assembly, and said lower blade spring member is disposed between a bottom portion of said housing and an uppermost portion of said steering knuckle.

17. The steering and suspension arrangement of claim 16 further comprising a lower swing arm having first and second ends, a third pivotal connection between said first end of said lower swing arm and said frame and a fourth pivotal connection between said second end of said lower swing arm and a lower portion of said steering knuckle.

18. The steering and suspension arrangement of claim 17 further comprising an axis about which said front wheel may rotate; and wherein at least a portion of said front wheel is located beneath said second connection, said first connection is positioned forwardly of said third connection, and said fourth connection is located higher than said axis of said front wheel.

19. The steering and suspension arrangement of claim 17 wherein the first connection lies on an upper line of an imaginary parallelogram; said imaginary parallelogram having four apexes and having three of its apexes lying on said second, third and fourth connections when the motorcycle is normally laden so that said swing arms function substantially as a parallelogram; and wherein a forward portion of the upper line of said imaginary parallelogram is moveable in a generally upward and downward direction through a swing angle about a pivot axis defined by an upper and rearwardly located apex of said imaginary parallelogram; and wherein said first pivotal connection is located upon a line which bisects said swing angle.

* * * * *